Oct. 11, 1949.                J. D. MINER, JR                2,484,237
                             REGULATING SYSTEM
                            Filed Aug. 30, 1946
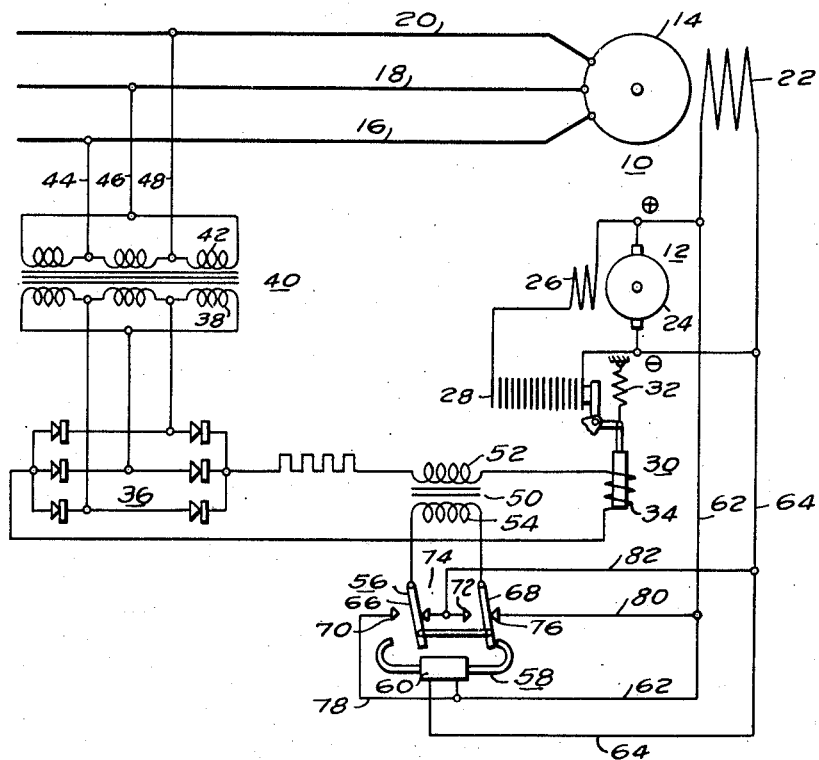
WITNESSES:                                        INVENTOR
                                                John D. Miner Jr.
                                                BY
                                                   James N. Ely
                                                      ATTORNEY Patented Oct. 11, 1949

2,484,237

UNITED STATES PATENT OFFICE 2,484,237

REGULATING SYSTEM

John D. Miner, Jr., Lima, Ohio, assignor to Westinghouse Electric Corporation, East Pittsburgh, Pa., a corporation of Pennsylvania Application August 30, 1946, Serial No. 694,059

6 Claims. (Cl. 322—19)

This invention relates to regulating systems.

Recently, alternating-current systems have been developed for use in aircraft. In such systems, where two or more generators are operated in parallel circuit relation and the excitation of each of the generators is controlled by an associated exciter, it has been found to be difficult to maintain the required voltage regulation. This is because the exciter introduces a time delay in the response of the field circuit of the generators with the result that hunting occurs. As a result, certain damping mechanisms have been used in an attempt to overcome such hunting effects but these have not proven to be successful in all cases and in particular where the exciter reverses polarity.

An object of this invention is to provide for insuring the correct phasing of a damping action on a regulator controlling the excitation of an exciter to prevent hunting of the dynamo-electric machine controlled by the exciter.

Another object of this invention is to provide in a regulating system for an alternating-current generator the excitation of which is controlled by an exciter, for a damping mechanism which is responsive to polarity changes of the exciter to insure correct phasing of the damping action to prevent hunting.

Other objects of this invention will become apparent from the following description, when taken in conjunction with the accompanying drawing the single figure of which is a diagrammatic representation of the circuits and apparatus embodying the teachings of this invention.

Referring to the drawing, this invention is illustrated by reference to an alternating-current generator 10, the excitation of which is supplied by an exciter 12, the generator 10 and exciter 12 being driven by a suitable prime mover (not shown). The generator 10 comprises armature windings 14 disposed to supply load conductors 16, 18 and 20 and field windings 22. The field windings 22 are connected across the armature windings 24 of the exciter 12 which is also provided with a field winding 26 for controlling the excitation of the exciter.

In the embodiment illustrated, a pile rheostat 28 is connected in circuit with the field winding 26, the pressure on the pile being controlled by the balance between the electromagnetic pull of an electromagnet 30 and the force of an opposing spring member 32. In order to control the magnetic pull on the electromagnet 30, the energizing winding 34 of the electromagnet is connected across the output terminals of a full-wave rectifier unit 36, the input terminals of which are connected to the secondary windings 38 of a potential transformer 40. The primary windings 42 of the transformer are connected by conductors 44, 46 and 48 to load conductors 16, 18 and 20, respectively. Thus, the winding 34 is energized and the pressure on the pile rheostat 28 is directly controlled by the voltage of the generator 10.

In order to control the operation of the electromagnet 30 to prevent hunting of the system, a damping transformer 50 is disposed with its secondary winding 52 connected in circuit between the full-wave rectifier 36 and the energizing winding 34 and its primary winding 54 disposed to be connected across the terminals of the armature windings 24 of exciter 12. However, under certain conditions of operation, such as where heavy transient currents react on the generator field winding 22 and the resultant high exciter transient currents cause an inductive potential drop which exceeds the potential of the exciter 12, then the polarity of the exciter 12 reverses.

In order to insure the correct connecting of the primary windings 54 of the damping transformer 50 to the exciter 12, a reversing contactor 56 is provided being disposed for operation in response to a polarized relay 58, the energizing winding 60 of which is connected by conductors 62 and 64 directly across the exciter 12 and the field windings 22 of the generator 10. The reversing contactor 56 illustrated comprises two movable contact members 66 and 68 disposed for simultaneous movement to engage fixed contact members 70 and 72, respectively, or to engage fixed contact members 74 and 76, respectively, depending upon the direction of energization of the polarized relay 58. The fixed contact members 70 and 76 are connected by conductors 78 and 80, respectively, to conductor 62, whereas, contact members 74 and 72 are connected by conductor 82 to conductor 64.

In operation, assuming that the generator 10 and exciter 12 are being operated to maintain a predetermined regulated value of the voltage across the load conductors 16, 18 and 20 and that the electromagnet 30 is so energized as to maintain a predetermined pressure on the pile rheostat 28, with the exciter 12 having the polarity as shown, the polarized relay is energized to maintain the reversible contactor 56 in the position shown. Under normal operating conditions, as the voltage across conductors 16, 18 and 20 varies from the predetermined value which is to be maintained, as for example, if the voltage increases, then the current flow through winding 34 increases to effect an operation of electromagnet 30 to release the pressure on the pile rheostat 28. As the resistance of the pile rheostat 28 is thus increased, the current flow through field winding 26 is reduced and the output of exciter 12 is decreased to effect a decrease in the excitation of the generator 10 and return its voltage to the regulated value.

As the voltage across the terminals of the exciter 12 decreases, the flow of current through conductors 62 and 80, contact members 76 and 68, primary winding 54 of damping transformer, contact members 66 and 74 and conductors 82 and 64 decreases to induce a voltage in the secondary winding 52 of the damping transformer 50 which will have a polarity in a direction to oppose the voltage drop across the energizing winding 34 and thereby decrease the energization of the electromagnet 30 in anticipation of the correction of the voltage of the generator 10 to prevent hunting in the regulating operation of the generator.

On the other hand, if the change in the voltage across conductors 16, 18 and 20 is a decrease from the predetermined value to be regulated, then the current flow through energizing winding 34 is so decreased that, under the influence of spring member 32, the pressure is increased on the pile rheostat 28 to effect an increase in the current flow through field winding 26 and an increase in the energization of exciter 12 with the result that the energization of generator 10 is increased to return its voltage to the regulated value.

As the voltage across the terminals of the exciter 12 increases, the flow of current through the damping transformer circuit described hereinbefore increases to induce a voltage proportional to the rate of change of the exciter voltage in the secondary winding 52 of damping transformer 50, which will have a polarity in a direction cumulative with the voltage drop across the energizing winding 34 to effect an increase in the energization of the electromagnet 30 in anticipation of the correction of the voltage of the generator 10 to prevent hunting during such regulating action.

The foregoing operations are, of course, for normal operation of the generator 10. If the generator 10 should be operated in a system where the load causes heavy transient currents to react on the generator field winding 22, with the result that high exciter transient currents produce an inductive potential drop which exceeds the potential of exciter 12, then the polarity of exciter 12 reverses from that shown. When such reversal of exciter polarity is encountered, the winding 60 of the polarized relay 58 is so energized as to actuate the reversing contactor 56 in the opposite direction to engage contact members 70 and 72 to properly connect the primary winding 54 of the damping transformer 50 in accordance with the polarity of the exciter 12.

Thus, as the current flow in energizing winding 34 increases in response to an increase in generator voltage above the predetermined value to be regulated, the damping transformer 50 still functions to induce a voltage in the secondary winding 52 proportional to the rate of change as the output of exciter 12 is decreased in response to the operation of electromagnet 30. This is evident, for with the polarity of the exciter 12 reversed from that shown, current flows from the exciter through conductors 64 and 82, contact members 72 and 68, primary winding 54 of damping transformer 50, contact members 66 and 70 and conductors 78 and 62 to the other terminal of the exciter 12. The induced voltage in the secondary winding 52 is therefore still of a polarity to oppose the voltage drop across energizing winding 34 to decrease the energization of the electromagnet 30 in anticipation of the correction of the voltage of generator 10 to prevent hunting.

Under conditions of reversed polarity for the exciter 12 as described, if the voltage of the generator 10 should decrease with the result that the energization of electromagnet 30 is decreased to effect an increase in the excitation of exciter 12; then the flow of current through the primary winding 54 of the damping transformer 50, which is connected across the exciter 12, increases to induce a voltage proportional to the rate of change of the exciter voltage in the secondary winding 52 which will have a polarity in a direction to effect an increase in the energization of electromagnet 30 in anticipation of the correction of the voltage of the generator 10 to prevent hunting.

As is evident, the damping transformer 50 is effective to prevent hunting in the regulating system described, provided it is properly connected across the exciter 12. The presence of the polarized relay 58 insures the proper connection of the damping transformer to insure correct phasing of the damping circuit with respect to the energized winding 34 of electromagnet 30 to prevent hunting. The system is of standard parts being readily assembled and connected and easily duplicated. By preventing hunting in this manner, close regulation can be obtained.

I claim as my invention:

1. In a regulating system for regulating the voltage of an alternating-current generator, in combination, an exciter for supplying the field excitation of the generator, means disposed to be energized for operation in accordance with the voltage of the generator for controlling the excitation of the exciter, a damping circuit connected in circuit relation with the energized means and the exciter for modifying the energization of the energized means in accordance with the rate of change of the exciter voltage, and means responsive to the polarity of the exciter disposed for operation to insure correct phasing of the damping circuit with respect to the energized means to prevent hunting.

2. In a regulating system for regulating the voltage of an alternating-current generator, in combination, an exciter for supplying the field excitation of the generator, means disposed to be energized for operation in accordance with the voltage of the generator for controlling the excitation of the exciter, damping means connected in circuit relation with the energized means and the exciter for modifying the energization of the energized means in accordance with the rate of change of the exciter voltage, and a polarized relay connected to be responsive to the polarity of the exciter disposed for operation to control the connection of the damping means to the exciter to insure correct phasing of the damping means with respect to the energized means to prevent hunting.

3. In a regulating system for regulating the voltage of an alternating-current generator, in combination, an exciter for supplying the field excitation of the generator, means disposed to be energized for operation in accordance with the voltage of the generator for controlling the excitation of the exciter, a damping transformer disposed to be connected to the exciter and connected in circuit relation with the energized means for modifying the energization thereof in accordance with the rate of change of the exciter voltage, and means responsive to the polarity of the exciter disposed for operation to control the connection of the damping transformer to the exciter to insure correct phasing of the damping transformer with respect to the energized means to prevent hunting.

4. In a regulating system for regulating the voltage of an alternating-current generator, in combination, an exciter for supplying the field excitation of the generator, means disposed to be energized for operation in accordance with the voltage of the generator for controlling the excitation of the exciter, a damping transformer disposed to be connected to the exciter and connected in circuit relation with the energized means for modifying the energization thereof in accordance with the rate of change of the exciter voltage, and a polarized relay responsive to the polarity of the exciter disposed for operation to control the connection of the damping transformer to the exciter to insure correct phasing of the damping transformer with respect to the energized means to prevent hunting.

5. In a regulating system for regulating the voltage of an alternating-current generator, in combination, an exciter for supplying the field excitation of the generator, a field winding for the exciter, a rheostat connected in circuit with the field winding of the exciter, means for actuating the rheostat, the rheostat actuating means comprising a winding connected to be energized in accordance with the voltage of the generator, damping means connected in the actuating winding circuit and disposed to be connected to the exciter for modifying the energization of the actuating winding in accordance with the rate of change of the exciter voltage, and means responsive to the polarity of the exciter disposed for operation to control the connection of the damping means to the exciter to insure correct phasing of the damping means with respect to the energization of the actuating winding to prevent hunting.

6. In a regulating system for regulating the voltage of an alternating-current generator, in combination, an exciter for supplying the field excitation of the generator, a field winding for the exciter, a rheostat connected in circuit with the field winding of the exciter, means for actuating the rheostat, the rheostat actuating means comprising a winding connected to be energized in accordance with the voltage of the generator, a damping transformer connected in the actuating winding circuit and disposed to be connected to the exciter for modifying the energization of the actuating winding in accordance with the rate of change of the exciter voltage, and a polarized relay responsive to the polarity of the exciter disposed for operation to control the connection of the damping transformer to the exciter to insure correct phasing of the damping transformer with respect to the energization of the actuating winding to prevent hunting.

JOHN D. MINER, Jr.

REFERENCES CITED

The following references are of record in the file of this patent:

UNITED STATES PATENTS

| Number | Name | Date |
|---|---|---|
| 2,211,612 | Thompson | Aug. 13, 1940 |